United States Patent
Brändle et al.

(10) Patent No.: US 9,585,512 B2
(45) Date of Patent: Mar. 7, 2017

(54) DRINK PREPARATION MACHINE, PARTICULARLY ESPRESSO MACHINE, COMPRISING A HEIGHT ADJUSTABLE DRINK OUTFLOW UNIT

(75) Inventors: Walter Brändle, Uttwil TG (CH); Fritz Forrer, Herisau AR (CH); Lars Birke, Tägerwilen (CH)

(73) Assignee: EUGSTER/FRISMAG AG, Amrlswill (CH)

( * ) Notice: Subject to any disclaimer, the term of this patent is extended or adjusted under 35 U.S.C. 154(b) by 672 days.

(21) Appl. No.: 12/799,614

(22) Filed: Apr. 28, 2010

(65) Prior Publication Data
US 2011/0174161 A1    Jul. 21, 2011

(30) Foreign Application Priority Data
Apr. 28, 2009   (DE) .................. 20 2009 006 129

(51) Int. Cl.
    *A47J 31/043*  (2006.01)
    *A47J 31/44*   (2006.01)
(52) U.S. Cl.
    CPC ................. *A47J 31/4482* (2013.01)
(58) Field of Classification Search
    CPC .................................. A47J 31/4482
    USPC ......... 99/297, 280, 286, 283, 279, 295, 306, 99/307, 287, 300, 292
    See application file for complete search history.

(56) References Cited

U.S. PATENT DOCUMENTS

| | | | | |
|---|---|---|---|---|
| 3,746,822 A | * | 7/1973 | Le Viet | 219/692 |
| 5,215,119 A | * | 6/1993 | Bolivar | 137/523 |
| 2007/0017376 A1 | * | 1/2007 | Oehninger | 99/279 |

FOREIGN PATENT DOCUMENTS

| | | |
|---|---|---|
| DE | 200 17 859 U1 | 4/2002 |
| DE | 202 20 056 U1 | 5/2004 |
| DE | 20 2005 011 476 U1 | 12/2005 |
| DE | 10 2007 038 352 A1 | 2/2009 |

* cited by examiner

*Primary Examiner* — Phuong Nguyen
(74) *Attorney, Agent, or Firm* — Norton Rose Fulbright US LLP

(57) ABSTRACT

In a drink preparation machine, particularly espresso machine, with a height adjustable drink outflow unit (6) disposed on the front side of a machine housing front wall (3), a machine housing front wall (3) having an opening (4) extending in height adjustment direction (5) through which opening (4) a drink supply pipe (22, 36) extends. In the machine housing (2) at least one masking band (8) is disposed behind the opening (4). The masking band (8) is connected to the drink outflow unit (6) and masks on the inside of the machine housing front wall (3) one section (41, 42) each of the opening (4) not covered on the outside. At least one deflection section (25', 28) of the masking band (8) is deflected away from the inner side of the machine housing front wall (3).

10 Claims, 2 Drawing Sheets

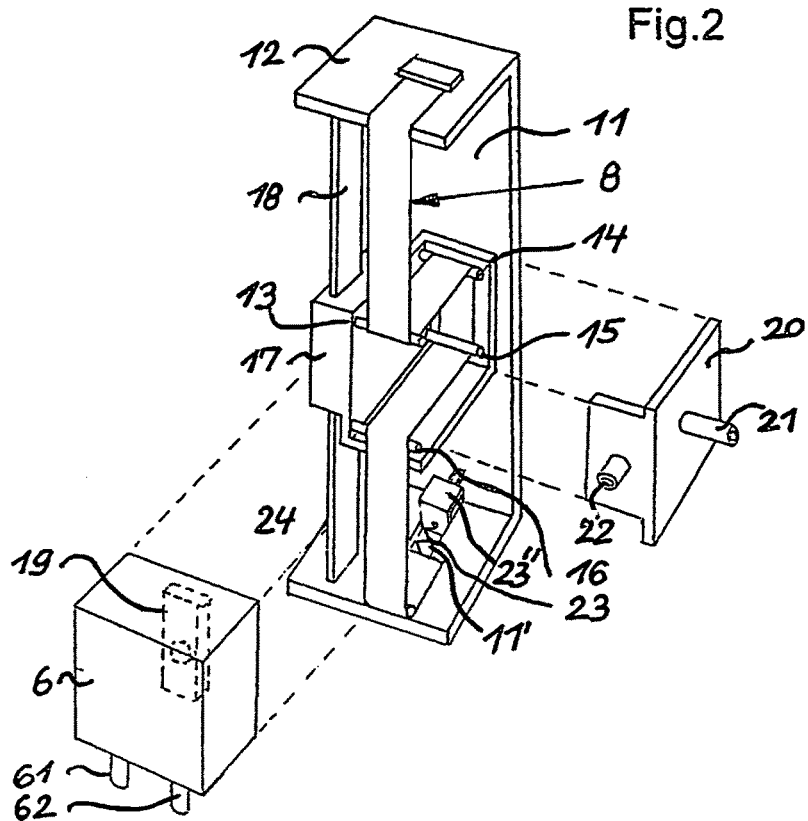

DRINK PREPARATION MACHINE, PARTICULARLY ESPRESSO MACHINE, COMPRISING A HEIGHT ADJUSTABLE DRINK OUTFLOW UNIT

BACKGROUND OF THE INVENTION

1. Field of the Invention

The present invention relates to a drink preparation machine, particularly espresso machine, comprising a height adjustable drink outflow unit.

2. Description of the Related Art

Drink preparation machines of this kind, particularly espresso machines, include a drink outflow unit in which at least one downwardly open outflow pipe is provided below which a receptacle, for instance a cup or a glass, can be disposed which receives the drink, or coffee, respectively, prepared by the drink preparation machine, particularly espresso machine. The drink outflow unit is height adjustable to permit the use of cups or glasses of different height to the upper open side of which the outflow pipe can be moved. The drink outflow unit which typically comprise's a drink outflow distributor is disposed on a front side of a machine housing front wall while the proper drink preparation device, particularly a brewing chamber of an espresso machine, is disposed within the machine housing. A drink supply pipe via which the drink is fed from inside of the machine housing from the drink preparation unit, or the brewing chamber, respectively, to the drink outflow unit passes through an opening of the machine housing front wall which extends in height adjustment direction of the drink outflow unit. If the means for the height adjustable support of the drink outflow unit are disposed within the machine housing as well, which is preferred, a connecting member extends from the drinks feeder pipe into the opening of the machine housing front wall, too. The means for the support of the drink outflow unit may consist of a carriage connected with it via the connecting member and movably guided on a vertical slide bar. This state of the art known from practice includes also that the slide bar together with the carriage and, if required, a drink feeder device connected with the proper drink preparation device, particularly the brewing chamber, on one hand, and with the drink outflow unit, or the connecting member, respectively, on the other hand, is arranged in a carrier chassis constituting a separate structural assembly mounted within the machine housing preferably on the machine housing front wall.

It is an disadvantage of such drink preparation machines, particularly espresso machines that the opening in the machine housing front wall extending in the adjustment direction of the drink outflow unit is not completely covered by the drink outflow unit, particularly if the latter is compact and if the height adjustment path is large. Through the open sections of the opening, dirt particles, particularly coffee remains, may penetrate into the interior of the drink preparation machine.

In order to avoid this, one might think of providing the drink outflow unit which is also referred to as outflow slide valve with a shield part outside in front of the machine housing front wall, which, however, might restrict the useful height adjustment path. In order to improve the support of such an outflow slide valve, it has been known to design it as two parts, viz. a shield part and an outflow distributor, wherein the outflow distributor can be extracted like a telescope from the shield part and is height-adjustably supported. This shall result in a more compact type of structure having a lager adjustment scope; it requires, however, a technically elaborate construction (DE 202 20 056 U1).

In another prior art coffee automat an outflow unit is supported on a carrier mounted to the outside of the machine housing front wall (DE 20 2005 011 476 U1). Through an opening of the machine housing front wall, a coffee supply pipe extends from the inside of the coffee automat into an outflow unit in which it is connected to a coffee outflow distributor which discharges into coffee outflow pipes. The support of the outflow unit is effected by means of a longitudinal ball bearing as a first bearing element which encompasses a vertical longitudinal ball bearing axis provided on the carrier as a second bearing element. However, while it is largely avoided when using this coffee automat that dirt particles penetrate through the opening of the machine housing front wall into the machine housing, the relative height adjustability of the outflow unit is smaller than the height dimension thereof.

BRIEF SUMMARY OF THE INVENTION

The object of the present invention is to provide a compact drink outflow unit which is height adjustable over a large adjusting path without using an external shield part so that, at no height adjustment, any uncovered areas of the opening of the machine housing front wall are open in order to so avoid a passage way for dirt particles, particularly coffee remains, into the interior of the espresso machine.

This above object is accomplished by a drink preparation machine, particularly an espresso machine, of the present invention that includes a height adjustable drink outflow unit essentially disposed on the front side of a machine housing front wall, wherein the machine housing front wall includes an opening extending in height adjustment direction through which opening a drink supply pipe extends between the drink outflow unit and the inside of a machine housing; and in the present invention, in the machine housing at least one masking band is disposed behind the opening which at least one masking band is connected with the drink outflow unit, particularly via a connecting member; at least one masking band masks on the inside of machine housing front wall with at least one covering masking band section one section each of the opening not covered on the outside; and at least one deflection section of at lest one masking band is deflected away from the inner side of the machine housing front wall.

By the drink preparation machine according to the present invention, it is reached that areas of the opening of the machine housing front wall which are not covered on the outside thereof by the drink outflow unit are covered, on the inner side of the housing front wall, by at least one masking band while not limiting the height adjustability of the outflow unit.

Since the masking band behind the opening in the machine housing is connected with the drink outflow unit, the masking band is adjusted depending on the height adjustment of the drink outflow unit so that, at any height adjustment, it will cover at the inside of the machine housing front wall at least one area of the opening not covered by the drink outflow unit on the outside so that, seen from the outside, the covering of the opening is complete. In order not to obstruct the height adjustability of the drink outflow unit, it has been provided, in particular that at least one deflection section of each at least one masking band is deflected away from the inner side of the machine housing front wall into the inside of the machine housing.

The arrangement of the at least one masking band on the drink outflow unit and the deflection of the masking band may be effected, as described later on, in two variations. In each variation, it is reached that one section of the opening which is covered from the outside by the height adjustable drink outflow unit will remain free in the interior of the machine housing in order to unobstructedly guide through it the drink supply pipe to the drink outflow unit and/or to obtain accessibility of the connecting member which extends from the drink outflow unit at least up into the opening, to the interior of the machine housing.

If the connecting member which extends from the drink outflow unit to at least the opening of the machine housing front wall is connected in the machine housing, with a carriage which is vertically movably supported, the at least one masking band is suitably connected with the carriage in order to either limit or move the masking sections covering the opening in the machine housing depending on the height adjustment of the drink outflow unit so that the section not covered by the masking band sections is adjusted as well.

In the first variant of the drink preparation machine of the present invention, one single masking band covers at the inner side one section each of the opening of the machine housing front wall not covered on the outside by the machine outflow unit above and below of the machine outflow unit without obstructing the passage of the drink supply pipe through the opening.

To this end, in the present invention, the masking band is particularly so disposed that an upper end section or a lower end section of the masking band is stationarily fixed or directly or indirectly connected to the machine housing front wall above or below, respectively, the opening of the machine housing front wall, that the masking band is stretched by means of a spring engaging at one of the other of the two end sections each, and that by means of masking band deflecting elements on the carriage, at least two deflection sections of the masking band which are indirectly or directly adjoining or neighboring each other do not cover, inside the machine housing, a section of the opening which is covered on the outside by the drink outflow unit, and in this way permit free passage of the drink supply pipe and/or the connecting member. The connecting member may be embodied as a section of the supply pipe which leads to the drink outflow in the drink outflow unit. In the machine housing, the masking band is guided between the deflection sections about a section of the supply pipe so that it can be deflected to a space within the machine housing in which it is movable when the drink outflow unit is height adjusted.

The spring tensioning the masking band can preferably be adjusted in the present invention by means of an adjusting unit coupled to it so that the initial tension of it or the traction exerted on the masking band may freely be selected. The adjusting unit coupled with the spring makes possible to compensate, by adjusting the spring initial tension, for part tolerances when assembling and to adjust, after assembly, differently heavy outflow units so that essentially equal adjusting forces can be applied to the outflow unit.

Further in detail, the masking band deflection elements connected with the carriage may be disposed so that between the two deflection sections of the masking band, an intermediate section is deflected in horizontal distance relative to the opening of the machine housing front wall. In this way, the section of the space open to the opening, which is restricted by the deflection section and the intermediate section, can be enlarged to receive one section of the drink supply pipe. This section of the drink supply pipe is preferably disposed on, or within, a coffee supply device by which the coffee supply pipe is deflected from an orientation perpendicular to the opening of the machine housing front wall into an orientation parallel thereto. Walls of the coffee supply device may laterally define the section of the space open to the opening which is included by the masking band in the deflection area.

Furthermore, in the present invention, the carriage is advantageously guided, precisely and easily adjustable on a vertical slide bar. Of advantage for the manufacture, the slide bar together with the carriage and optionally the drink supply device together with the drink supply pipe are disposed on a carrier chassis mounted inside the machine housing, preferably on the machine housing front wall. One of the two end sections of the masking band and the spring at the other of the two end sections are attached to the carrier chassis. Therefore, the means for partly masking the opening of the machine housing front wall, of the opening of the drink supply pipe through the machine housing front wall and of the support of the drink outflow unit are disposed on the carrier chassis which can be assembled as one unit in the machine housing. This unit can be prefabricated prior to the use in the machine housing and, if necessary, may be exchanged for cleaning and/or maintenance or repair.

The above-referred to arrangement of the masking band deflection elements on the carriage may be defined in that the deflection sections of the masking band and, optionally, the intermediate section thereof which is disposed between the deflection sections, define the section of the space open to the opening essentially in a C-shape.

According to the present invention, the four masking band deflection elements, if and when they deflect the masking band together with one intermediate section in a horizontal distance relative to the opening of the machine housing front wall, are disposed in an approximately rectangular arrangement wherein in each corner of the arrangement one of the masking band deflection elements is disposed.

A masking band deflection element of this sort may include a rotatably supported deflection roll which rotates when the drink outflow unit on the masking band tensioned by means of the tension spring is height adjusted so that the masking band is deflected almost frictionless. It is, however, also possible to develop the masking band deflection elements simply stationary having a smooth surface, at least on the surface area over which the masking band can glide.

A masking band which is particularly wear-resistant and fulfilling the masking function is a glass-fiber reinforced and "Teflon"-coated texture band. ("Teflon" is a trademark used for synthetic fluorine containing resins.)

In the second variant of the drink preparation machine according to the present invention, two flexible masking bands are provided on the carriage movably supported on the machine housing which is connected via the above-mentioned connecting member with the height adjustable drink outflow unit so that an unobstructed passage of the drink supply pipe through the opening to the drink outflow unit is guaranteed in view of the separated and spaced provision of the end sections of the masking bands. At the respective other ends of the masking bands, deflection sections are formed by stationary masking band deflection elements so that the masking bands are deflected from the inner side of the machine housing front wall further into the interior of the machine housing and thus cannot, neither above nor below, strike against the machine housing.

To this end, the second variant of the drink preparation machine of the present invention includes the features that an end section of one upper masking band is fixed to an upper side of the carriage, that the upper masking band extends with an upper masking section on the inner side of the machine housing front wall upward to an upper stationary masking band deflection element which deflects a deflection section of the upper masking band away from the inner side of the machine housing front wall, that an end section of the lower masking band is fixed to an underside of the carriage, that the lower masking band extends with a lower masking section, on the inner side of the machine housing front wall, downward to a lower stationary masking band deflection element which deflects a deflection section of the lower masking band away from the inner side of the machine housing front wall, and that between the end sections of the two masking bands fixed to the carriage, a section of the opening is not masked in the machine housing by the masking bands which, on the outside, is masked by the drink outflow unit and through which the drink supply extends, wherein the masking bands are flexible bands.

Furthermore, in the present invention, the carriage is again movably guided on a vertical slide bar and the slide bar together with the carriage and, optionally, a drink supply device to the drink supply pipe are disposed in a carrier chassis, wherein on this carrier chassis the masking band deflection elements are provided as well. The carrier chassis, on the other hand, is preferably attached as one unit within the machine housing preferably to the machine housing front wall. The advantages obtained through this carrier chassis unit are basically the same as described above with reference to the first variant.

In both of the two variants of the drink preparation machine according to the present invention, the masking band deflection elements may be formed simply as stationary glide deflection guidances. In one of these glide deflection guidances each, one of the masking bands is guided, substantially at right angles, away from the inner side of the machine front wall to the inside of the machine housing. In the second variant, the flexible masking bands are stiff enough not to bend outside the slide deflection guidance when, in case of a height adjustment of the drink outflow unit, one of the two masking bands each is pushed into its associated glide deflection guidance.

To this end, the flexible masking bands are preferably metal tapes of the kind as known from self coiling measuring tapes.

BRIEF DESCRIPTION OF THE SEVERAL VIEWS OF THE DRAWINGS

The two variants of the present invention will be described in the following based on a drawing including four figures, from which further advantageous details may be apparent.

FIG. 2 shows, graphically and partly disassembled, as a first variant of the present invention, a carrier chassis to be mounted in a machine housing including a drink outflow unit detached from the carrier chassis;

FIG. 3 shows a partly sectional side elevation of the espresso machine including the drink outflow unit according to FIG. 1 showing the carrier chassis partly in cross section of FIG. 2 but without a drink supply unit shown as detached in FIG. 2; and FIG. 4 shows a partly sectional side elevation of the espresso machine including the drink outflow unit according to FIG. 1 and, as the second variant of the present invention, a carrier chassis as a side view.

DETAILED DESCRIPTION OF THE INVENTION

Figure 1:
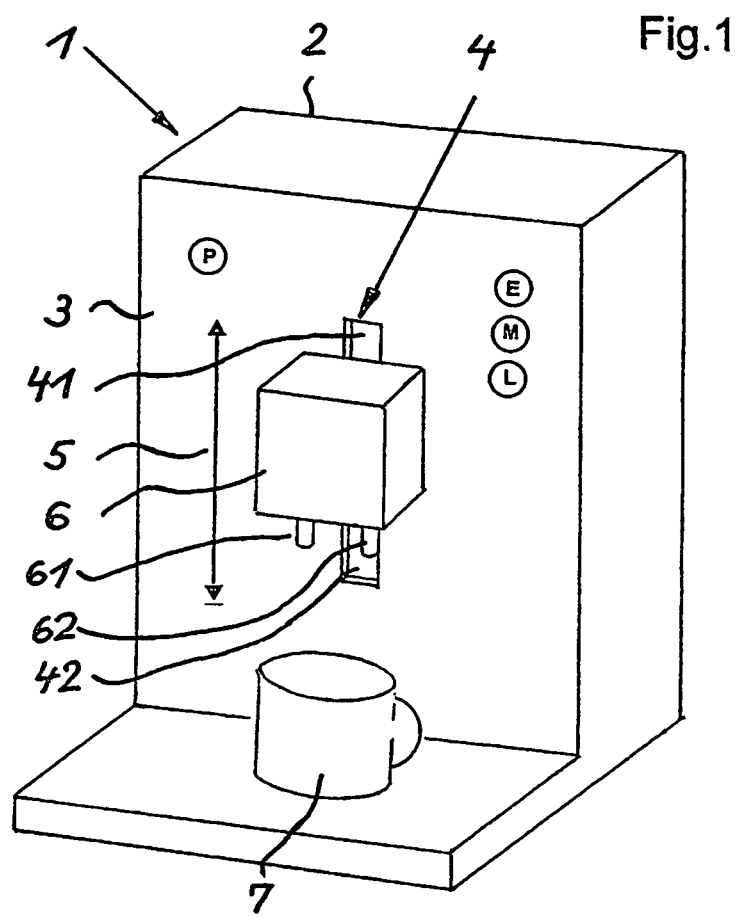
FIG. 1 shows an espresso machine according to the present invention including a drink outflow unit, viz. a coffee outflow unit, and an opening in the machine housing front wall which in both of the variants of the present invention is masked on sections of the machine housing.

FIG. 1 shows an espresso machine 1 comprising a machine housing 2 and a machine housing front wall 3 in which an opening 4 is provided.

The opening 4 extends in height adjustment direction 5 of a drink outflow unit 6, in the present case of a coffee outflow unit, which is adjustable above the position of a receptacle 7. The drink outflow unit 6 comprises two drinks outflows 61, 62, viz. coffee outflows which extend below from the drink outflow unit 6.

Sections 41, 42 of the opening 4 which are not masked on the outside by the drink outflow unit 6, are masked on the inner side of the machine housing front wall 3 by at least one masking band. In the first variant according to FIGS. 2 and 3, one single masking band 8 masks sections 41, 42 at the inside. In the second variant according to FIG. 4, the sections 41, 42 are masked by an upper flexible masking band 9 and a lower flexible masking band 10.

In the first variant of the present invention, the masking band 8 is held on, or in, a carrier chassis 11 which is approximately C-shaped and arranged the machine housing 2, with the side of the carrier chassis 11 open in the area of the masking band 8 facing the opening 4 in the machine housing front wall 3.

The easily deflectable masking band 8, namely its upper section 8', is secured to an upper part 12 of the carrier chassis 11 and is guided by means of deflection rolls 13 to 16 to a carriage 17 which is height adjustably movable, together with the drink outflow unit 6, on a vertical slide bar 18 in the carrier chassis 11. To this end, the carriage 17 is solidly connected, via a connecting member 19, to the drink outflow unit 6. The solid connection may be effected by a section 22 of the drink supply pipe. The section 22 and a subsequent section 21 of the drink supply pipe oriented at right angles to the section 22 are held in the drink supply device 20 which is formed as an angular piece. The drink supply device 20 can solidly be fixed to the carriage 17 and can thus form part of the carriage 17.

The masking band 8 is connected below its lower deflection section 29 via a spring 23, particularly a tension spring, to a lower part 24 of the carrier chassis 11, the masking band 8 being tensioned by the spring 23.

In the above-described arrangement of the first variant of the present invention, the masking band 8 is fixed together with the carrier chassis 11 to the inner side of the machine housing front wall 3 so that it masks, by means of an upper masking band section 25 and a lower masking band section 26 each above and below of the deflection rolls 13 to 16, the opening 4 on the inside in such locations where the sections 41, 42 of the opening 4 are not masked on the outside by the drink outflow unit 6. Between the deflection rolls 13 and 14, the masking band 8 is deflected below the upper masking band section 25 to an upper deflection section 25', away from the inner side of the machine housing front wall 3. The masking band 8 is maintained at a constant distance relative to the inner side of the machine housing front wall 3 in an intermediate section 27 which extends downward to the deflection roll 15. Adjacent thereto, the masking band 8 is again deflected between the deflection rolls 15 and 16 to the inner side of the machine housing front wall 3 in order to mask the section 42 of the opening 4 with the lower masking band section 26. Adjacent to the lower masking band section 26, the masking band 8 forms the lower end section 8" in that it is deflected to the lower part 24 of the carrier chassis.

In this way, the masking band 8 defines, in the deflection area between the deflection rolls 13 to 16, an approximately C-shaped space open to the opening 4 through which the drink supply pipe passes which forms the drinks-conducting connection between a brewing unit, not shown, and the connecting member 19 or the drink outflow unit 6, respectively.

To make sure that the masking band 8 constantly takes the shape described above, it is tensioned by a spring 23 which is connected, on one hand, to the lower end section 8″ of the masking band 8, and on the other hand, via an adjusting unit 23′, 23″, to the carrier chassis 11. Particularly the spring 23 is a tension spring which is secured to the end section 8″, on one hand, and to the adjusting unit 23′, 23″, on the other.

By means of the adjusting unit 23′, 23″, the spring bias and hence the tensile strain of the masking band 8 can be adjusted. The adjusting unit 23′, 23″ comprises, in detail, an adjusting screw 23′ which is rotatably and axially supported in the carrier chassis 11 and engages with a thread section in a thread of an adjusting element 23″ which is movably guided in a slot 11′ of the carrier chassis 11 and is connected with the end section 8″ of the masking band 8.

Instead of the above-described attachment of the masking band 8 in the chassis 11, it is, on the other hand, also possible to attach the upper end section 8′ of the masking band 8 via the spring 23 and of the adjusting unit 23′, 23″, with adjustable tensile strain to the upper part 12 of the carrier chassis and to fasten the lower end section 8″ to the bottom on the carrier chassis 11.

In both cases, the bias of the spring 23 may be adjusted by turning the adjusting screw 23′ of the adjusting unit 23′, 23″ while the spring 23 does not twist as the rotation of the adjusting screw 23′ is not transferred to the spring 23 because of the connecting element 23″ guided in the slot 11′ of the chassis 11, but rather a longitudinal displacement of the spring end connected with the connecting element 23″ is reached resulting from the engagement of the thread section of the adjusting screw 23′ in the thread of the connecting element 23″.

The deflectable masking band 8 is preferably a glass fiber reinforced and "Teflon" coated texture band.

The frictional forces on the deflection rolls 13 to 16 and on the carriage 17 guided on the vertical glide bar 18, caused by the deflection of the masking band 8 and the tension forces engaging on it, may be useful for locking the adjusted height of the drink outflow unit 6.

In the second variant of the present invention according to FIG. 4, the upper flexible masking band 9 and the lower flexible masking band 10 are provided on a carriage 29 which, similar to the carriage 17 of the first variant, is height adjustably guided together with the housing outflow unit 6 on a vertical slide bar 30. The vertical slide bar 30 and the carriage 29 are arranged, similar to the first variant, in a carrier chassis 31 which is arranged in the machine housing 2 so that an upper masking band section 32 and a lower masking band section 33 are disposed tightly behind the opening 4 of the machine housing front wall 3.

Below the upper masking band section 32, an end section 9′ of the upper flexible masking band 9 is disposed on the upper side 34 of the carriage 29, and above the lower masking band section 33, an end section 10′ of the lower flexible masking band 10 is secured to the lower side 38 of the carriage 29. Adjacently, a section 44 of the opening 4 not masked on the outside by the drink outflow unit 6, is not masked inside by the masking bands 9, 10. Through the section 44, a drink supply pipe 36 passes, unobstructed, from a space in the carriage 29 open at the opening 4 into the drink outflow unit 6. From this space, the drink supply pipe 36 is laterally guided outside, as shown in FIG. 4. Corresponding to the height adjustment of the drink outflow unit 6, the drink supply pipe 36 may movably extend further inside the machine housing 2 to a brewing unit, not shown.

The deflection of the upper flexible masking band 9 and of the lower flexible masking band substantial for reducing the vertical installation space, is effected on top of the carrier chassis 31 on a glide deflection guidance 37 and, below on the carrier chassis 31, on a glide deflection guidance 38 disposed on the bottom side of the carrier chassis 31. By means of the glide deflection guidances 37, 38, the upper flexible masking band 9 and the lower flexible masking band 10, respectively, constitute the deflection sections 39, 40.

The flexible masking bands 9 and 10 are sufficiently stiff not to be bent or folded, between the glide deflection guidance 37 and the end section 9′ on the carriage 29 and between the glide deflection guidance 38 and the end section 10′ on the carriage 29, respectively, away from the inner side of the machine housing front wall 3.

For this purpose, the flexible masking bands 9 and 10 are advantageously metal bands of the kind as known in principle from self-reeling measuring tapes.

The invention claimed is:

1. A drink preparation machine comprising:
   a machine housing having a machine housing front wall in which an opening is provided;
   a drink outflow unit that is disposed on a front side of the machine housing front wall, that masks a middle section of the opening as viewed from the front side of the machine housing front wall, that does not mask upper and lower sections of the opening as viewed from the front side of the machine housing front wall, and that is movable relative to the machine housing front wall in a height adjustment direction;
   a drink supply pipe that extends through the opening and between said drink outflow unit and an inside of the machine housing; and
   a masking band that is fixed to an inner side of the machine housing front wall, that is connected with said drink outflow unit via a connecting member, and that masks the upper and lower sections of said opening as viewed from the front side of the machine housing front wall that are not masked by the drink outflow unit as viewed from the front side of the machine housing front wall, wherein
   deflection sections of said masking band are deflected away from the inner side of said machine housing front wall at right angles to the height adjustment direction in correspondence with movement of the drink outflow unit in the height adjustment direction,
   a first end section of said masking band is stationarily fixed above or below the opening of the machine housing front wall,
   a second end section of said masking band is connected with a spring tensioning the masking band,
   masking band deflection elements are disposed on the carriage so that the deflection sections of the masking band, which indirectly or directly adjoin or neighbor each other, do not cover, inside the machine housing, the middle section of the opening that is covered outside by the drink outflow unit,
   the drink supply pipe extends into the middle section of the opening, and
   the masking band is a glass fiber reinforced and Teflon coated texture band or a flexible metal tape.

2. The drink preparation machine according to claim 1, wherein
   said connecting member is connected with a carriage which is vertically movably supported in said machine housing and
   said masking band is connected with said carriage.

3. The drink preparation machine according to claim 1, wherein one single masking band covers, at the inner side, the upper and lower sections of the opening of the machine housing front wall not covered on the outside above and below by the drink outflow unit.

4. The drink preparation machine according to claim 1, wherein said spring tensioning said masking band is adjusted by an adjustment unit coupled to said spring.

5. The drink preparation machine according to claim 1, wherein said masking band deflection elements connected with said carriage are so disposed that between the deflection sections an intermediate section is deflected in horizontal distance relative to said opening of said machine housing front wall.

6. The drink preparation machine according to claim 1, wherein
   said carriage is movably guided on a vertical slide bar,
   said slide bar together with said carriage and optionally a drink supply device together with at least one section of said drink supply pipe are disposed on a carrier chassis which is mounted inside the machine housing preferable on said machine housing front wall, and
   one of said end sections of said masking band and said spring are attached to said carrier chassis.

7. The drink preparation machine according to claim 1, wherein said deflection sections and, optionally, the intermediate section of said masking band circumscribe a section of a space not restricted by said masking band approximately in a C-shape.

8. The drink preparation machine according to claim 1, wherein there are four masking band deflection elements in an essentially rectangular arrangement, and wherein one of said four masking band deflection elements is disposed in each corner of said arrangement.

9. The drink preparation machine according to claim 1, wherein said masking band deflection elements are rotatably supported deflection rolls.

10. The drink preparation machine according to claim 1, wherein each of said masking band deflection elements is formed as a stationary glide deflection guidance.

\* \* \* \* \*